United States Patent
Meijer

(10) Patent No.: US 6,807,404 B2
(45) Date of Patent: Oct. 19, 2004

(54) ANTENNA DIVERSITY RECEIVER WITH VARIABLE SWITCHING DELAY TIME

(75) Inventor: Pieter Meijer, Eindhoven (NL)

(73) Assignee: Siemens AG, Frankfurt (DE)

( * ) Notice: Subject to any disclaimer, the term of this patent is extended or adjusted under 35 U.S.C. 154(b) by 653 days.

(21) Appl. No.: 09/842,585

(22) Filed: Apr. 25, 2001

(65) Prior Publication Data

US 2002/0013136 A1 Jan. 31, 2002

(30) Foreign Application Priority Data

Apr. 25, 2000 (EP) .......................................... 00201474

(51) Int. Cl.[7] ................................................ H04B 1/10
(52) U.S. Cl. ................................ 455/277.2; 455/277.1; 455/278.1
(58) Field of Search .......................... 455/277.2, 277.1, 455/278.1, 283, 135

(56) References Cited

U.S. PATENT DOCUMENTS

| | | | | |
|---|---|---|---|---|
| 3,670,275 A | * | 6/1972 | Kalliomaki et al | 455/132 |
| 3,693,088 A | * | 9/1972 | Rustako et al. | 455/506 |
| 4,143,369 A | * | 3/1979 | Ayers | 342/45 |
| 4,170,759 A | * | 10/1979 | Stimple et al. | 455/277.1 |
| 4,255,816 A | * | 3/1981 | Grunza et al. | 455/277.1 |
| 4,370,522 A | * | 1/1983 | Takeda et al. | 381/3 |
| 4,495,653 A | * | 1/1985 | Hamada | 455/277.1 |
| 4,499,606 A | * | 2/1985 | Rambo | 455/277.2 |
| 4,726,073 A | * | 2/1988 | Sessink | 455/205 |
| 5,379,449 A | | 1/1995 | Porambo | |
| 5,742,896 A | | 4/1998 | Bose et al. | |

FOREIGN PATENT DOCUMENTS

EP 0 274 157 A1 12/1987

* cited by examiner

*Primary Examiner*—Edward F. Urban
*Assistant Examiner*—Huy Phan
(74) *Attorney, Agent, or Firm*—Mayer, Brown, Rowe & Maw LLP

(57) ABSTRACT

An antenna diversity receiver with a variable delay time for antenna switching is disclosed. The antenna diversity receiver includes an antenna selective switching means for coupling one of a plurality of antennas to a RF receiver input. A multipath detector controls the antenna selective switching means. A switching disabling means automatically disables the antenna selective switching means over a disabling period. In order to accurately immunize the receiver the disabling period is controlled by an adjacent channel detector to increase the period with increasing adjacent channel interferences and to decrease the period with descreasing channel interferences.

19 Claims, 2 Drawing Sheets

ANTENNA DIVERSITY RECEIVER WITH VARIABLE SWITCHING DELAY TIME

FIELD OF INVENTION

This invention relates to an antenna diversity receiver for selecting and coupling one of a plurality of antennas to a RF receiver input with a multipath detector to activate changing the antenna at the occurrence of multipath interferences in the RF reception signal and automatically disabling the switching during a disabling period following each such change over.

BACKGROUND OF INVENTION

The reception of a wanted RF broadcast transmitter signal may be disturbed or otherwise deteriorated by various phenomena, such as multipath reception and/or adjacent channel interferences. In general, multipath reception is caused by signal reflections at and/or against environmental physical obstacles such as mountains, trees, buildings, fences and the like. Due to such signal reflections an RF broadcast signal may arrive at a certain reception location through various different signal paths in various different amplitude and phase conditions. The summation of these multipath signals at the antenna of the receiver results in unpredictable signal amplitude and/or phase distortions. These effects often result in partial or complete cancellation of the useful RF reception signal. These signal cancellations, hereinafter also being referred to as signal dips, strongly depend on the RF carrier frequency of the received RF broadcasting signal and on the location of reception. The signal dips severely deteriorate the wanted RF broadcasting signal and therefore the overall signal reception quality as well.

However, a relatively small shift in the position of the antenna suffices to strongly improve the signal reception quality. This solution is used in antenna diversity receivers to avoid reception of multipath distorted RF signals and in particular with mobile FM receivers. Such antenna diversity receivers are provided with two or more mutually spaced apart antennas which may be coupled to a RF input of a receiver. Only the antenna having best local receiving conditions with respect to the other antenna(s) is actually connected to the RF receiver input. This antenna, also referred to as the actual antenna, is effective in the reception and supply of the wanted RF broadcasting signal to the receiver as long as the multipath distortion at the actual antenna remains smaller than a certain predetermined multipath threshold level. As soon as the received multipath distortion exceeds the certain predetermined multipath threshold level, a change over in the RF signal supply to the receiver from this actual antenna to another antenna positioned at a location with better receiving conditions, is initiated. The receiver is thus continuously optimized for minimum multipath reception.

Inherent to antenna diversity receivers are short interruptions in the RF signal supply to the receiver during an antenna change over or switching action. Due to the delay between the occurrence of an actual multipath caused signal dip and the detection of the dip, the RF signal interruptions may be detected as being caused by multipath effects, and may therewith initiate a subsequent false antenna switching action. Such false antenna switching may in its turn be detected as a multipath originated signal dip again, initiating a further false antenna switching action, and so on and so forth, with an oscillating effect as a result. To reduce the risk of oscillating antenna switching, antenna diversity receivers which use the Philips' IC TEA 6101 antenna diversity integrated circuit may be provided with a switching disabling circuit which automatically disables the antenna selective switching circuit to change antennas over a certain predetermined fixed disabling period following each such change over or switching action following a preceding switching action within a certain predetermined fixed time period.

This method is not effective in receivers with dynamic IF selectivity, such as receivers with adjacent channel suppression. As explained above, adjacent channel interferences are another important source of signal distortion and are usually caused by FM radio broadcast signals modulated on a carrier positioned infrequency adjacent to the carrier frequency of a wanted FM radio broadcast signal. Due to peak values in the FM modulation signal, these adjacent channel FM radio signals may temporarily exceed the allocated channel bandwidth and break through into the frequency range of the wanted FM radio broadcast signal. In receivers with adjacent channel suppression such adjacent channel interferences are suppressed by varying the bandwidth of the variable bandwidth intermediate frequency (IF) selective circuit. This is dependent on the deviation of the adjacent channel signal within the frequency range of the wanted FM radio broadcast signal. The larger the deviation, the smaller the bandwidth of the variable bandwidth intermediate frequency (IF) selective circuit. The dynamically varying IF selectivity thus effectuates a suppression of the adjacent channel interferences. However, this method cannot capture the benefits of using diverse antennas.

There is thus a need for a receiver which combines the benefits of the antenna diversity feature with those of the dynamic IF selectivity feature. There is a further need for a receiver which combines antenna diversity with dynamic IF selectivity while preventing unwanted effects. There is also a need for a receiver which to maximizes the area in which the antenna diversity feature is operative, without giving rise to switching oscillating effects.

SUMMARY OF THE INVENTION

The needs may be met by the present invention which may be embodied in an antenna diversity receiver having antenna selective switching means for selecting and coupling one of a plurality of antennas to an RF receiver input. The receiver includes a multipath detector to activate the antenna selective switching means to change over to another antenna at the occurrence of multipath interferences in the RF reception signal of the one antenna. A switching disabling means automatically disables the antenna selective switching means to change antennas during a disabling period following each such change over. An adjacent channel detector controls the disabling period to increase with increasing adjacent channel interferences and vice versa.

The receiver is based on the recognition that the delay between the actual occurrence of a multipath caused signal dip and its detection is determined by the receiver's IF selectivity in an antenna diversity receiver. In a receiver with dynamic IF selectivity, the IF bandwidth is variable, causing the delay to vary as well. The smaller the IF bandwidth the longer the delay and vice versa. However, the longer the delay, the longer the time period between the switching actions required to avoid the risk of oscillating false antenna switching actions.

The present invention combines the features of antenna diversity and dynamic IF selectivity, while preventing antenna switching actions from oscillating. The invention also allows accurate definition when to disable such antenna switching actions. The disabling period is dynamically varied with the delay between the actual occurrence of a multipath caused signal interference and the detection of the interference with the IF bandwidth. This is in contrast to the above mentioned receiver which uses a fixed disabling period, during which switching actions are disabled irrespective of the actual delay, (the actual IF bandwidth). This may cause unnecessary disabling of antenna switching actions, and in particular this will occur at greater IF bandwidth. By applying the present invention, such unnecessary disabling of antenna switching actions may be prevented, allowing the area in which the antenna diversity feature is operative to be maximized without giving rise to switching oscillating effects.

For reliable implementation, the antenna diversity receiver is preferably characterized by the adjacent channel detector being coupled to a control terminal of a variable timer circuit defining the disabling period. The variable timer circuit may include a digital counter having a variable counting cycle. Detecting switching actions is preferably implemented by an antenna switching detection means with a signal level detection means and an OR gate coupled between said plurality of antennas and the switching disabling means. A cost-effective embodiment of the invention is characterized by the OR gate means having an exclusive OR gate for each pair of antennas. The antennas within each such pair are coupled through the signal level detection means to the first and second input terminals of the exclusive OR gate, directly and via a delay element. An output of each of the exclusive OR gates is coupled to an input of a nonexclusive OR gate which has an output coupled to the switching disabling means.

A further cost reduction is obtained with a delay element having an RC member with a serial resistor and a mass connected capacitor. The joint connection of the resistor and the capacitor are coupled to the signal level detection means by respectively, the signal level detection means coupled to the second input terminal of the exclusive OR gate.

The antenna diversity receiver according to the invention is characterized by a threshold circuit coupled between an output of the adjacent channel detector and a control input of the switching disabling means to accurately match the control range of the variable timer circuit to the control range of the IF bandwidth. The switching disabling means compares the output signal of the adjacent channel detector with a threshold value limiting the control range of the variable timer circuit at a predetermined value.

This measure also allows for combining the antenna disabling feature based on a fixed disabling period used in the known receiver with the disabling feature according to the invention. The adjacent channel detector may be used for the antenna disabling feature as well as for controlling the bandwidth of a variable bandwidth intermediate frequency (IF) selectivity to decrease bandwidth with increasing adjacent channel interferences and vice versa, therewith realizing the feature of dynamic selectivity or adjacent channel suppression.

In yet another preferred embodiment, the plurality of antennas includes an antenna for receiving radio broadcast RF signals as well as an antenna for receiving telecommunication RF signals.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENTS

Figure 1:
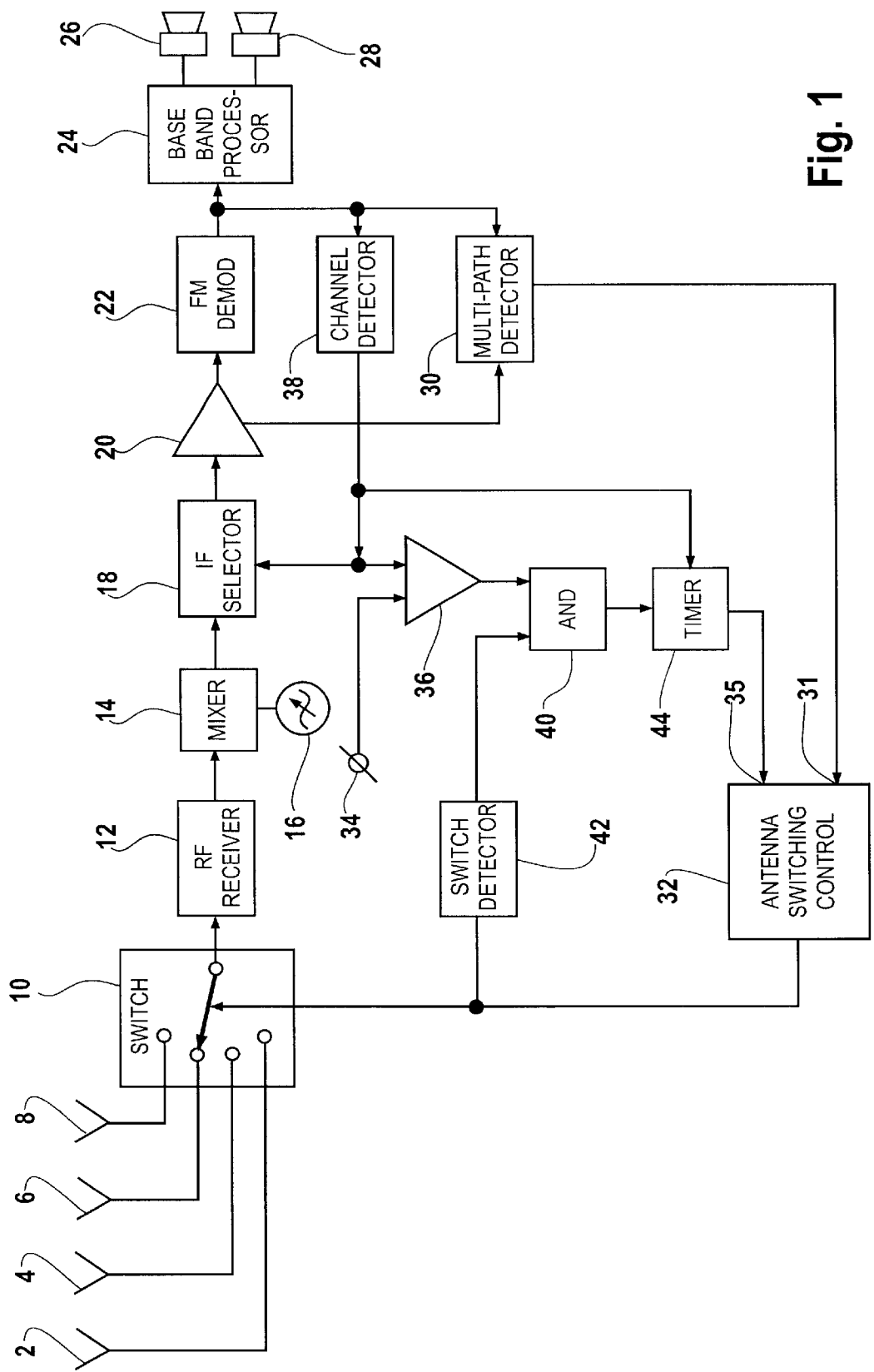
FIG. 1 shows a preferred embodiment of a receiver according to the invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 shows an antenna diversity FM receiver according to one embodiment of the present invention which has first through fourth antennas 2, 4, 6 and 8 coupled through an antenna selective switching circuit 10 to an RF receiver input circuit 12. The RF receiver input circuit 12 is followed by a mixer device 14 which is supplied with a tunable local oscillator signal from an oscillator circuit 16. The oscillator circuit 16 is coupled to a variable bandwidth intermediate frequency (IF) selective circuit 18 also referred to as a selective IF circuit, an IF amplifier 20, a FM demodulator 22 and a baseband modulation signal processor 24. The signal processor 24 is coupled to stereo left and stereo right signal reproducing circuits 26 and 28.

The signal processing operation of the antenna diversity receiver described above is known. A RF broadcasting signal is received at one of the first through fourth antennas 2, 4, 6 and 8. In this example, the third antenna 6 (also referred to as actual antenna) is supplied via the antenna selective switching circuit 10 to a RF receiver input terminal of the RF receiver input circuit 12 for broadband selection and amplification. The output signal of the RF receiver input circuit 12 is then mixed in the mixer device 14 with the tunable local oscillator signal for a first demodulation of a wanted RF broadcast signal into an intermediate frequency (IF) signal. The IF signal is filtered in the selective IF circuit 18, subsequently amplified in the IF amplifier 20 and demodulated in the FM demodulator 22 into a baseband modulation signal including a stereo multiplex (MPX) signal. The MPX signal is further processed in the processor 24 to obtain stereo left and stereo right signals to be converted into acoustic signals in the stereo left and stereo right signal reproducing circuits 26 and 28.

The antenna diversity receiver also has a multipath detector 30 for detection of multipath distortion in the received RF signal. The detection of multipath distortion is based on two criteria: the occurrence of a (fast) amplitude dip in the level of the IF signal and the occurrence of distortion components occurring within the frequency range of the baseband modulation signal above the frequency spectrum of the MPX signal. The multipath detector 30 has first and second input terminals which are coupled respectively to an output of the selective IF circuit 18 and to an output of the FM demodulator 22. If an IF signal dip is detected occurring simultaneously with distortion components within the frequency range of the baseband modulation signal, the multipath detector 30 supplies a switching control signal to a switching control signal input terminal 31 of an antenna switching control device 32. This causes the antenna selective switching circuit 10 to change over reception from the antenna 6 (the actual antenna to this switching action) to another antenna having better receiving conditions than the antenna 6. This can be the antenna 8 (the connection to the RF receiver input circuit 12 is not shown). The next detection of a multipath caused signal dip, will initiate a subsequent antenna switching action in the same manner. In a practical embodiment of the receiver, the Philips' IC TEA 6101 antenna diversity integrated circuit may be used to implement the functions of the multipath detector 30 and the antenna switching control device 32. The antenna switching control device 32 integrated in this circuit includes a switching disabling component (not shown) which prevents any antenna switching action from being followed by a subsequent antenna switching action within a fixed time period of 20 usec. This delay is referred to as a fixed switching disabling period. The antenna switching disabling circuit includes a counter device, which is set to start counting monotonously up or down at the occurrence of each switching control signal and stops counting after the fixed time period of 20 usec, providing immunity from switching control signals during counting. This prevents switching actions during the fixed switching disabling periods from occurring. In practice a fixed antenna switching disabling time period of 20 usec corresponds with a delay effectuated at a bandwidth substantially within the range between 40 and 50 KHz of the IF select circuit 18 depending on the steepness of the selectivity used.

The antenna diversity receiver is provided with an adjacent channel detector 38 which functions as a bandwidth control. The adjacent channel detector has an input coupled to an output of the FM demodulator 22. An output of the adjacent channel detector 38 provides a DC control voltage signal to a bandwidth control input of the selective IF circuit 18. This output varies the bandwidth of the IF circuit 18 depending on adjacent channel interferences. This is performed so when the bandwidth of the selective IF circuit 18 is smaller, the more the adjacent channel signal is overlapping or trespassing the frequency area of the wanted RF signal. The interferences caused by such an adjacent channel signal are thereby reduced. For a more detailed description of the functioning of the adjacent channel feature in suppressing adjacent channel interferences, U.S. Pat. No. 4,907,293 is hereby incorporated by reference.

In addition to the fixed switching disabling periods the receiver is also provided with immunity from switching control signals during a switching disabling period following each antenna switching action, which increases when the bandwidth of the selective IF circuit 18 decreases and vice versa. The DC control output voltage of the adjacent channel detector 38 controlling the bandwidth of the selective IF circuit 18, which provides a reliable measure for the bandwidth, is also used to control the switching disabling period as mentioned above. The switching disabling period varies with the above signal delay in the receiver. Thus, the longer the delay, the longer the switching disabling period and vice versa. By selecting the switching disabling period to be a little longer than the receiver signal delay, oscillating antenna switching actions may reliably be avoided under any circumstance of multipath distortion and/or adjacent channel interference. Also oscillating antenna switching may be avoided under reception conditions at which the IF-bandwidth may become very narrow. The extra period over which the switching disabling period should be longer than the receiver signal delay, may be in the order of some useconds. In this manner it is possible to guarantee that the switching disabling period is never larger than strictly necessary to avoid antenna switching actions from oscillating.

In order to perform this function, the receiver has a threshold circuit 36 coupled between an output of the adjacent channel detector 38 and a control input 35 of the antenna switching control device 32 via an AND gate 40 and a variable timer circuit 44. The output DC voltage signal of the adjacent channel detector 38 is compared with a threshold value Vth supplied to the terminal 34 by the threshold circuit 36. The threshold value Vth is chosen to correspond to the IF-bandwidth at which the filter delay becomes larger than the fixed switching disabling period of 20 usec. An output of the threshold circuit 36 is coupled to a first input of the AND gate 40. An output of the antenna switching control device 32 is coupled via an antenna switching detector 42 to a second input of the AND gate 40. The AND gate 40 provides a trigger signal to the variable timer circuit 44 when both the DC-control output voltage of the adjacent channel detector 38 exceeds Vth and an antenna switching action is detected by the antenna switching detector 42. The DC-control output voltage of the adjacent channel detector 38 is also coupled to a control terminal of the variable timer circuit 44 to vary the time base in order to increase it with decreasing IF bandwidth and vice vera. In a practical implementation, the variable timer circuit 44 has a digital counter device with a variable counting cycle. An output of the variable timer circuit 44 is coupled to a disabling input 35 of the antenna switching control device 32 to disable any antenna switching action during the counting process. The disabling period may be substantially some (e.g. 2) u-seconds longer than the delay caused by the IF selectivity circuit 18. As mentioned above, when using the Philips IC TEA6101 antenna diversity integrated circuit, the dynamically varying antenna switching disabling period is activated in addition to the fixed antenna switching disabling period already present in the circuit.

Figure 2:
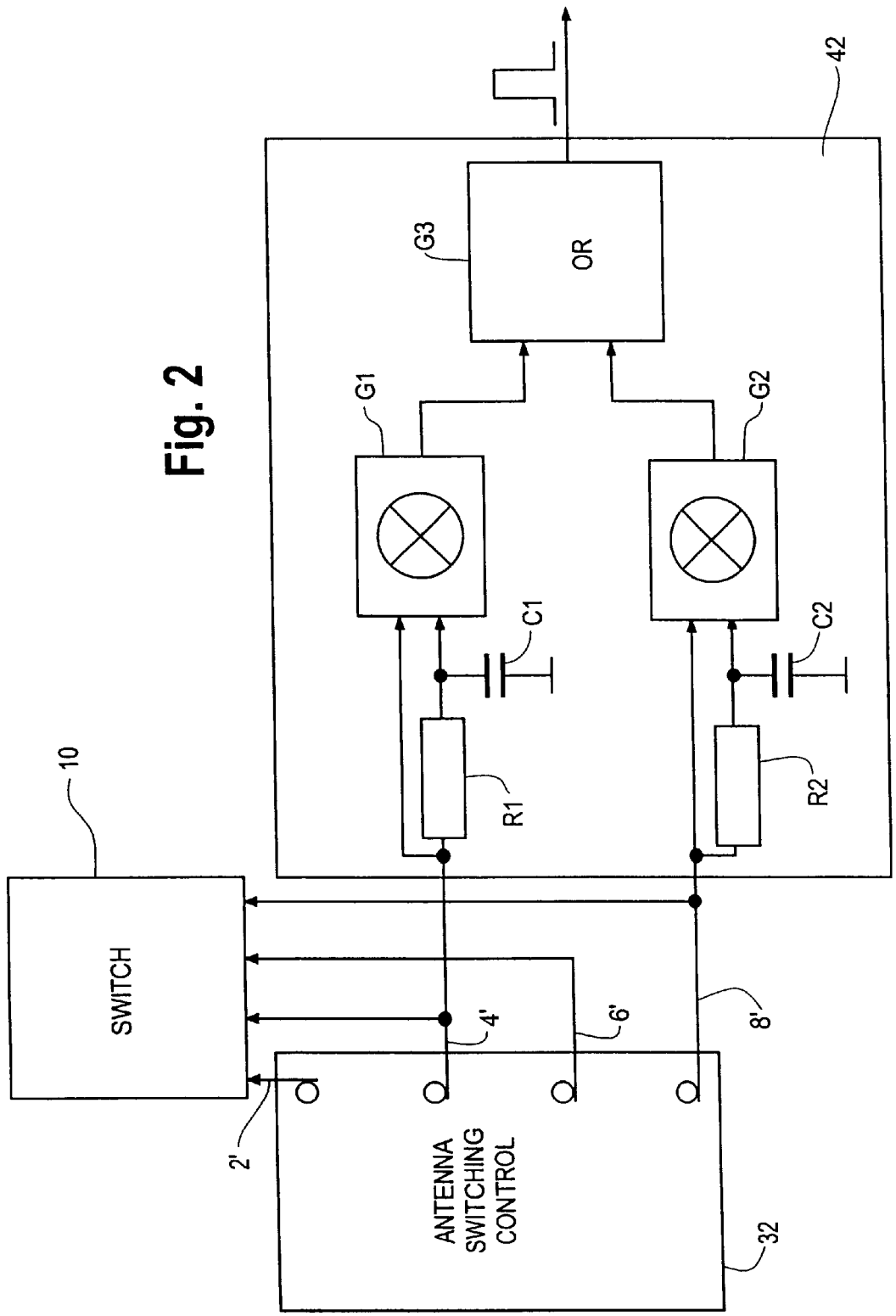
FIG. 2 shows a preferred embodiment of the antenna switching detection circuit for use in the receiver of FIG. 1.

FIG. 2 shows a preferred embodiment of the antenna switching detector 42 for use in combination with the antenna switching control device 32 as implemented in the above mentioned Philips IC TEA6101 antenna diversity integrated circuit. This integrated circuit is provided with 4 pin connectors 2', 4', 6', 8', only one of these having a high output voltage or digital "1" value, when the corresponding antennas 2, 4, 6 or 8 is the actual reception antenna, i.e. is coupled via the antenna selective switching circuit 10 to the RF receiver input circuit 12. The pin connectors 4' and 8' are coupled to exclusive OR gates G1 and G2, respectively, directly and through delay elements R1 and C1 and R2 and C2, respectively. The Outputs of the exclusive OR gates G1 and G2 are coupled to inputs of a non-exclusive OR gate G3, which is connected to the above mentioned second input of the AND gate 40.

The delay elements R1 and C1 and R2 and C2 each are a RC circuit delaying the supply of the digital value supplied at the pin connectors 4' and 8' over a RC time constant to one of the inputs of the respective exclusive OR gates G1 and G2. A high or digital "1" value arising at the pin connector 4' will immediately be supplied to the one input of the exclusive OR gate G1 and some time later at the other input of the exclusive OR gate G1. This results in a pulse shaped signal at the output of the exclusive OR gate G1, which passes through the non-exclusive OR gate G3 to the second input of the AND gate 40, since, at that moment, the other input of the OR gate G3 is low. Therefore switching from a first antenna to a second antenna results in a high pulse on the output of the OR gate G3. A similar process occurs for switching from the second antenna to the third antenna, from the third antenna to the fourth antenna, and so on. The output pulses of the antenna switching detector 42 represent antenna switching actions, while using a minimum number of circuit components.

It will be apparent to those skilled in the art that various modifications and variations can be made in the method and system of the present invention without departing from the spirit or scope of the invention. For example, the plurality of antennas may comprise an antenna for receiving radio broadcast RF signals as well as an antenna for receiving telecommunication RF signals. The use of a fixed antenna disabling period may also be dispensed with. The present invention is not limited by the foregoing descriptions but is intended to cover all modifications and variations that come within the scope of the spirit of the invention and the claims that follow.

What is claimed is:

1. An antenna diversity receiver comprising:
    an antenna selective switching means for selecting and coupling one of a plurality of antennas to a RF receiver input;
    a multipath detector for activating said antenna selective switching means to change over to another antenna at the occurrence of multipath interferences in the RF reception signal of said one antenna;
    switching disabling means for automatically disabling the antenna selective switching means to change antennas over a disabling period following each such change over from the occurrence of multipath interferences; and
    an adjacent channel detector for controlling said disabling period to increase the disabling period proportionally with increasing adjacent channel interferences.

2. An antenna diversity receiver according to claim 1, wherein said adjacent channel detector is coupled to a control terminal of a variable timer circuit defining said disabling period.

3. An antenna diversity receiver according to claim 2, wherein said variable timer circuit includes a digital counter having a variable counting cycle.

4. An antenna diversity receiver according to claim 1 wherein the antenna switching detection means includes a signal level detection means and an OR gate means coupled between said plurality of antennas and the switching disabling means.

5. An antenna diversity receiver according to claim 4, wherein said OR gate means includes an exclusive OR gate for each pair of antennas included in said plurality of antennas;
    the antennas within each such pair being coupled through said signal level detection means to first and second input terminals of the exclusive OR gate, directly, and via a delay element; and
    an output of each exclusive OR gate being coupled to an input of a non-exclusive OR gate, an output thereof being coupled to the switching disabling means.

6. An antenna diversity receiver according to claim 5, wherein said delay element includes a RC member having a serial resistor and a mass connected capacitor, the joint connection of the resistor and the capacitor being coupled to the said signal level detection means by the second input terminal of said exclusive OR gate.

7. An antenna diversity receiver according to claim 2 wherein a threshold circuit is coupled between an output of the adjacent channel detector and a control input of the switching disabling means for comparing the output signal of the adjacent channel detector with a threshold value limiting the control range of the variable timer circuit at a predetermined value.

8. An antenna diversity receiver according to claim 7, wherein the switching disabling means includes a fixed timer circuit defining a fixed disabling period corresponding to said predetermined value.

9. An antenna diversity receiver according to claim 7 further comprising an AND gate having a first input coupled to the antenna switching detection means and a second input coupled to the threshold circuit, and an output coupled to the control terminal of said variable timer circuit.

10. An antenna diversity receiver according to claim 1 wherein the adjacent channel detector includes a multiplex input coupled to an output of the demodulator for detecting adjacent channel reception at the occurrence of both an amplitude variation in the IF signal level as well as distortion components in the demodulator output signal.

11. An antenna diversity receiver according to claim 1 wherein variable bandwidth intermediate frequency (IF) selectivity is controlled by the adjacent channel detector to decrease in bandwidth with increasing adjacent channel interferences.

12. An antenna diversity receiver according to claim 1 wherein the plurality of antennas includes an antenna for receiving radio broadcast RF signals or an antenna for receiving telecommunication RF signals.

13. An antenna diversity receiver comprising:
   a plurality of antennas;
   a RF receiver input;
   an antenna selective switch coupled to the plurality of antennas and the RF receiver, the switch selecting and coupling one of the plurality of antennas to the RF receiver input;
   a multipath detector coupled to the antenna selective switch and which activates the switch to change over to another antenna at the occurrence of multipath interferences in the RF reception signal of said one antenna;
   a switching disabling circuit which automatically disables the antenna selective switch from changing antennas over a disabling period following each change over at the occurrence of multipath interferences in the RF reception signal; and
   an adjacent channel detector which increases said disabling period proportionally with increasing adjacent channel interferences and decreases said disabling period proportionally with decreasing channel interferences.

14. An antenna diversity receiver according to claim 13, wherein said adjacent channel detector is coupled to a control terminal of a variable timer circuit defining said disabling period.

15. An antenna diversity receiver according to claim 14, wherein said variable timer circuit includes a digital counter having a variable counting cycle.

16. An antenna diversity receiver according to claim 14 wherein a threshold circuit is coupled between an output of the adjacent channel detector and a control input of the switching disabling circuit which compares the output signal of the adjacent channel detector with a threshold value limiting the control range of the variable timer circuit at a predetermined value.

17. An antenna diversity receiver according to claim 16, wherein the switching disabling circuit includes a fixed timer circuit defining a fixed disabling period corresponding to said predetermined value.

18. An antenna diversity receiver according to claim 13 wherein the adjacent channel detector includes a multiplex input coupled to an output of the demodulator for detecting adjacent channel reception at the occurrence of both an amplitude variation in the IF signal level as well as distortion components in the demodulator output signal.

19. An antenna diversity receiver according to claim 13 wherein variable bandwidth intermediate frequency (IF) selectivity is controlled by the adjacent channel detector to decrease in bandwidth with increasing adjacent channel interferences.

* * * * *